(12) United States Patent
McNealy et al.

(10) Patent No.: US 9,236,966 B2
(45) Date of Patent: Jan. 12, 2016

(54) CLOCK SYNCHRONIZATION FOR A MACHINE CONTROL SYSTEM

(75) Inventors: Anthony D. McNealy, Peoria, IL (US); Alan L. Ferguson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 2271 days.

(21) Appl. No.: 11/289,456

(22) Filed: Nov. 30, 2005

(65) Prior Publication Data

US 2007/0124504 A1    May 31, 2007

(51) Int. Cl.
*G06F 15/16* (2006.01)
*H04J 3/06* (2006.01)

(52) U.S. Cl.
CPC ............ *H04J 3/0638* (2013.01); *H04J 3/0655* (2013.01); *H04J 3/0661* (2013.01)

(58) Field of Classification Search
USPC .......................................................... 709/248
See application file for complete search history.

(56) References Cited

U.S. PATENT DOCUMENTS

| | | | |
|---|---|---|---|
| 5,666,330 A * | 9/1997 | Zampetti | 368/47 |
| 5,910,160 A * | 6/1999 | Cakmakci et al. | 62/195 |
| 6,121,816 A | 9/2000 | Tonks et al. | |
| 6,292,045 B1 | 9/2001 | Bongiorno et al. | |
| 6,535,926 B1 | 3/2003 | Esker | |
| 6,720,920 B2 * | 4/2004 | Breed et al. | 342/386 |
| 2002/0069299 A1 * | 6/2002 | Rosener et al. | 709/248 |

* cited by examiner

*Primary Examiner* — Shripal Khajuria
(74) *Attorney, Agent, or Firm* — Finnegan, Henderson, Farabow, Garrett & Dunner, LLP

(57) ABSTRACT

A clock synchronized control system includes a controller configured to control at least one function of a work machine. The controller may also be configured to select a clock source from among a plurality of external clock sources based on a predetermined order. The controller may be further configured to obtain information from the selected clock source. The controller may also be configured to use the obtained information to affect the at least one function of the work machine.

27 Claims, 3 Drawing Sheets

CLOCK SYNCHRONIZATION FOR A MACHINE CONTROL SYSTEM

TECHNICAL FIELD

The present disclosure is related to a system and method for obtaining information from an off-board clock source and, more particularly, to a system and method for receiving information from a plurality of off-board clock sources and synchronizing work machines using the received information.

BACKGROUND

Many machines include on-board systems such as electronics, software, etc., that perform certain functions that make use of clock information. These functions may include, for example, logging and reporting the occurrence of events at specific times, automatically performing certain tasks at predetermined times, etc. Furthermore, a number of machines that are geographically dispersed, but yet part of the same fleet, may exchange information with each other by sending messages directly to each other. These messages may include timestamps indicating, for example, the time a message was sent from a work machine, the time a particular task was performed by a work machine, etc.

It is important to keep clock information consistent within various devices on a machine and also between physically separate machines. This may be done to ensure, among other things, accurate and efficient data communications between the physically separate machines and also between devices located on the same machine. A machine may receive clock information from various sources. In one instance, a machine may receive clock information from a clock on board the machine. Specifically, an electronic component on a machine may receive clock information from a battery-operated clock located on the machine. A battery-operated clock may include, among other things, an oscillator, a counter, and a battery.

However, there may be problems associated with obtaining clock information from an on-board battery-operated clock. Specifically, the battery-operated clock may not provide accurate clock information. This lack of accuracy may be due to the climatic conditions in which the machine operates. For example, a machine may operate in extreme climatic conditions including, for example, cold nights and hot days. A large temperature gradient may cause the battery-operated clock to lose its accuracy over a period of time. Therefore, as time goes by, some functions performed by the machine may be affected by this lack of clock accuracy. For example, messages sent by a machine including time stamps generated by an on-board battery-operated clock may not include accurate clock information. This lack of clock accuracy may lead to problems in many instances, especially where other entities, such as, for example, other machines, or an off-board control system, may rely on time-sensitive information sent by the machine.

In order to remedy the problem of inaccurate clock information being available from an on-board clock, some machines may use external clock sources, i.e., clock sources that are located off board a machine. These external clock sources may include more sophisticated and more accurate time keeping equipment. One such system is described in U.S. Pat. No. 6,535,926 B1 ("the '926 patent") to Esker, which issued on Mar. 18, 2003. The '926 patent discloses the use of a global independent synchronization pulse to synchronize local clocks used for local events in an industrial control system. The method includes detecting at a first industrial controller, a global reference pulse and storing the time value of the master clock. This time value is transmitted by the first industrial controller as a time message on the network to other industrial controllers. A second industrial controller also detects the global reference pulse and stores a value of the local clock at that time. It then receives the time message from the first industrial controller and compares its stored local time with the time value of the first time message to deduce an error value. This error value is used to correct the clock of the second industrial controller. The '926 patent discloses that the global reference pulse may be obtained from an external clock source such as a global positioning system ("GPS").

While the '926 patent discloses the use of an external clock source to help synchronize time across industrial controllers, it has several shortcomings. For example, all the controllers in the '926 system have to connect to the external clock source. This may be problematic because not every controller in a network may have the capability to connect to an external clock source. Furthermore, the '926 patent does not disclose the use of more than one external clock source. This may be problematic if the only external clock source being used becomes unavailable.

The present disclosure is directed to overcoming one or more of the problems of the prior art time synchronization system.

SUMMARY OF THE INVENTION

One aspect of the present disclosure includes a clock synchronized control system. The system may include a controller configured to control at least one function of a work machine. The controller may also be configured to select a clock source from among a plurality of external clock sources based on a predetermined order. The controller may be further configured to obtain information from the selected clock source. The controller may also be configured to use the obtained information to affect the at least one function of the work machine.

Another aspect of the present disclosure includes a method for clock synchronized control of a machine. The method may include selecting a clock source from among a plurality of external clock sources based on a predetermined order. The method may also include obtaining information from the selected clock source. The method may also include using the obtained information to affect at least one function of a work machine.

Yet another aspect of the disclosure includes a clock information transfer system. The system may include a first work machine including a controller configured to control at least one function of the first work machine. The controller may also be configured to select a clock source from among a plurality of external clock sources based on a predetermined order. The controller may be further configured to obtain clock information from the selected clock source. The controller may also be configured to use the obtained information to affect the at least one function of the first work machine. The controller may also be configured to transmit the obtained information to a second work machine including a receiving controller. The receiving controller may be configured to control at least one function of the second work machine. The receiving controller may also be configured to operably connect to the controller of the first work machine. The receiving controller may be further configured to obtain information from the controller of the first work machine. The receiving controller may also be configured to use the obtained information to affect the at least one function of the second work machine.

Another aspect of the present disclosure includes a work machine. The work machine may include a frame and a power source operably connected to the frame. The work machine may also include a controller configured to control at least one function of the work machine. The controller may also be configured to select a clock source from among a plurality of external clock sources based on a predetermined order. In addition, the controller may be configured to obtain information from the selected clock source. The controller may also be configured to use the obtained information to affect the at least one function of the work machine.

DETAILED DESCRIPTION

Figure 1:
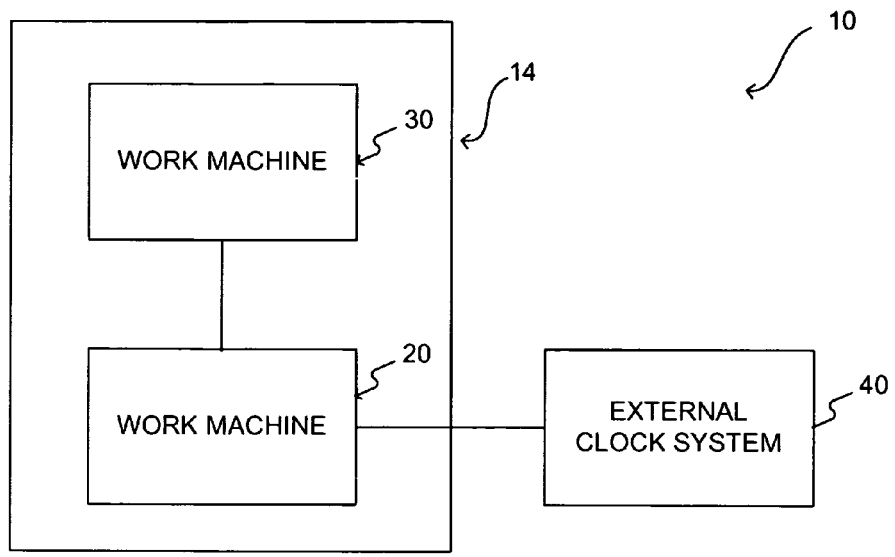
FIG. 1 is a block diagram representation of a global clock synchronization system according to an exemplary disclosed embodiment.

FIG. 1 provides a block diagram representation of a clock synchronized control system 10. System 10 includes a work machine system 14 that may include work machines 20 and 30. System 10 also includes external clock system 40. Work machine 20 and work machine 30 may include a track type tractor, a truck, wheeled tractor, dump truck, automobile, on-highway vehicle, off-highway vehicle, skid-steer, stationary generator, air compressor, or any other such machine. External clock system 40 may be physically separate from work machines 20 and 30, and may include a plurality of clock sources configurable to provide information to work machine 20. One skilled in the art will appreciate that while only two work machines are shown as part of work machine system 14, any number of work machines may be included in work machine system 14.

Work machines 20 and 30 may include a power source (not shown) and a frame (not shown). The power source may include one or more devices configured to provide power for the operation of work machines 20 and 30. These devices may include, for example, an electric motor, an engine, a battery, etc. In an exemplary embodiment, the power source may include an engine such as, for example, a diesel engine, a gasoline engine, a steam engine, etc. In addition, any other engine configurable to provide power for the operation of work machines 20 and 30 may be used as a power source. The power source may be operatively coupled to a frame.

In an exemplary embodiment, work machine 20 is configured to operatively connect to external clock system 40 and obtain information from external clock system 40. Because external clock system 40 includes a plurality of clock sources, work machine 20 may be configured to obtain information from one of the plurality of external clock sources according to a predetermined order. The information obtained may include data that may be used for the operation of work machine 20. In an exemplary embodiment, this data may include clock information. In addition, work machine 20 may obtain any other data that is obtainable from external clock system 40 and may be used for operation of work machine 20.

Work machine 20 may be configured to transfer the information obtained from external clock system 40 to other entities that are located remotely (physically separate) from work machine 20. These entities may include any system that is capable of receiving information from work machine 20. These entities may include, for example, other work machines, a base station, a monitoring station, or any other such entity configured to receive such information from work machine 20. In an exemplary embodiment, work machine 20 may be configured to operatively connect to work machine 30 and transmit the information received from external clock system 40 to work machine 30 or any other work machine capable of receiving clock information. While only one work machine, i.e., work machine 30, is shown in the exemplary embodiment as being connected to work machine 20, one skilled in the art will appreciate that, as noted above, any number of work machines may be connected to work machine 20. Thus, for example, in a system including a geographically dispersed fleet of work machines, all the work machines that are not directly connected to external clock system 40 may connect to work machine 20 to obtain, among other things, information that is received by work machine 20 from external clock system 40.

Figure 2:
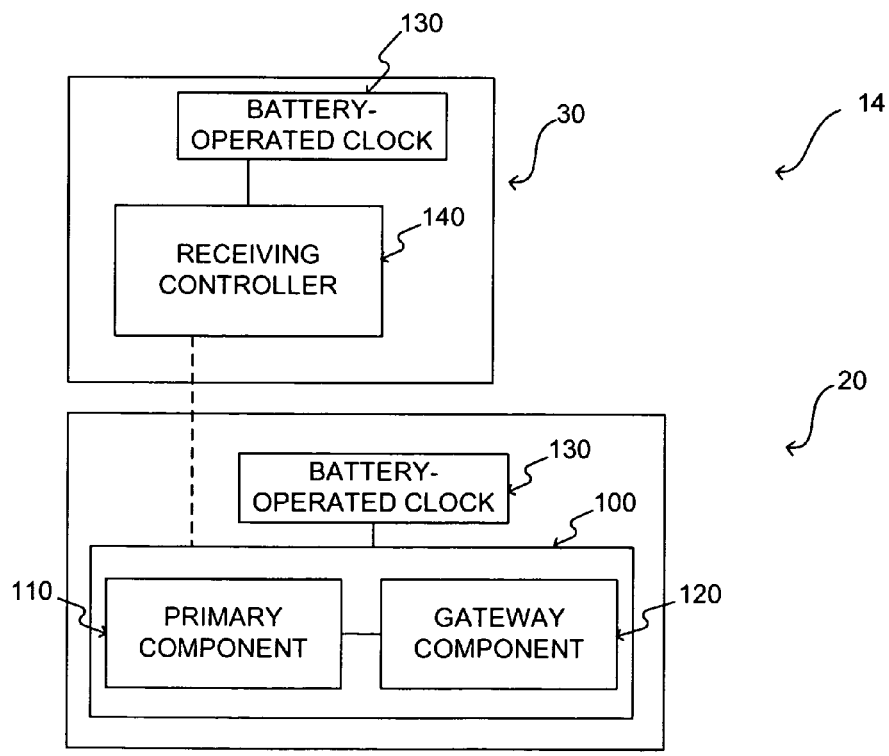
FIG. 2 is a block diagram representation of a work machine system according to an exemplary disclosed embodiment.

FIG. 2 is a block diagram representation of work machine system 14. As described above, in an exemplary embodiment, work machine system 14 may include work machine 20 and work machine 30. Work machine 20 may include a controller 100. Controller 100 may include a primary component 110 and a gateway component 120. Work machine 20 may also include a battery-operated clock 130. Work machine 20 may operatively connect to work machine 30. Work machine 30 may include a receiving controller 140 and its own battery-operated clock 130.

Controller 100 may be configured to control at least one function of work machine 20. These functions may include, for example, regeneration of exhaust elements, transmission control, payload control, hydraulic brake control, etc. Furthermore controller 100 may be configured to select a clock source from among a plurality of external clock sources in external clock system 40. Upon obtaining information from external clock system 40, controller 100 may use the obtained information to affect the at least one function of work machine 20. In addition, controller 100 may be configured to transmit the information obtained from external clock system 40 to receiving controller 140 located on work machine 30.

Controller 100 may include one or more components, including software, that may be configured to perform the operations noted above. Furthermore, controller 100 may include any devices suitable for running a software application. For example, controller 100 may include a CPU, RAM, I/O modules, etc. In an exemplary embodiment, all the components of controller 100 may be integrated into one physical unit to perform the operations noted above. In another exemplary embodiment, controller 100 may include two or more separate components that may be configured to perform the above-mentioned operations.

Gateway component 120 may be configured to operably connect to and obtain information from external clock system 40. Furthermore, gateway component 120 may be configured to choose the clock source from the plurality of clock sources in external clock system 40, from which gateway component 120 may obtain information. Gateway component 120 may be configured to make this choice on the basis of a predetermined order. Gateway component 120 may be further configured to transmit the information received from a clock source in external clock system 40 to primary component 110.

Gateway component 120 may include one or more devices configurable to, among other things, connect to external clock system 40, determine the appropriate clock source from the plurality of clock sources in external clock system 40, and pass information received from the chosen clock source in external clock system 40 to primary component 110. In an exemplary embodiment, gateway component 120 may include programmable logic devices, such as, for example, PL300, PL1000e, and other such electronic control devices that are configurable to transfer data from one communication port to another.

In an exemplary embodiment, gateway component 120 may include different types of communication ports such as, for example, serial ports, datalink ports, and Ethernet ports. On-board devices such as primary component 110 and off-board systems, such as, for example, external clock system 40, may connect to communication ports on gateway component 120. Gateway component 120 may be configured to transfer information between the connected devices/systems by transferring information from one communication port to another. This information may include, for example, clock information received from external clock system 40 that is destined for primary component 110.

Gateway component 120 may be configured to use a software application to perform functions, such as, for example, choosing the appropriate clock source in external clock system 40, receiving information from the chosen clock source, and transferring the received information to primary component 110. Furthermore, the software application may also be used to translate data being transferred from one communication protocol to another, etc. For example, if information is being transferred from an Ethernet port to a datalink port using a datalink protocol, such as, for example, J1939, the software in gateway component 120, may be configured to translate the data packets from Ethernet to J1939. This software application may be written in a computing language, such as, for example, C, C++, Pascal, Visual C++, or Visual Basic, etc. Furthermore, gateway component 120 may include a CPU, RAM, I/O modules, and any other component needed to run the software application.

Primary component 110 may use the information received from gateway component 120 to affect the operation of work machine 20. These operations may include any electronically controllable function of work machine 20 that may make use of information obtained from external clock system 40. For example, primary component 110 may use the received clock information to timestamp log messages being sent to a remote system such as, for example, an off-board monitoring system, another work machine, a base station, an off-board logging device, etc. In addition, primary component 110 may also use the information received from gateway component 120 to affect time-sensitive operations of work machine 20. For example, based on clock information received from gateway component 120, primary component 110 may start and stop the operation of work machine 20 in accordance with a predetermined timetable. For example, the start time and stop time of a power source for work machine 20 may be controlled based on the clock information received from gateway component 120. Alternatively, or in addition, primary component 110 may use the clock information received from external clock system 40 via gateway component 120 to control the regeneration of an exhaust element in work machine 20. Specifically, the regeneration duration of an exhaust element may be controlled based on the clock information received from gateway component 120. If primary component 110 is unable to receive information from external clock system 40, then primary component 110 may use clock information generated by battery-operated clock 130.

Primary component 110 may be configured as an individual controller including its own CPU, memory unit, I/O modules etc., separate from gateway component 120 that may be configured as another individual controller. Alternatively, both primary component 110 and gateway component 120 may be integrated together into a single controller 100 as shown in FIG. 2.

Controller 100 may be configured to transfer information received from external clock system 40 to work machine 30 that is located remotely (physically separate) from work machine 20. Specifically, either primary component 110 or gateway component 120 may be configured to transfer information from controller 100 to work machine 30. Work machine 30 may include any receiving system configured to receive information from work machine 20. The receiving system may include an electronic control device configured to receive information from controller 100 on work machine 20. In an exemplary embodiment, primary component 110 may be configured to transmit information received from gateway component 120 to receiving controller 140 located on work machine 30.

Receiving controller 140 may include one or more devices configured to receive information from controller 100. Furthermore, receiving controller 140 may be configured to control any electronically controllable operation of work machine 30. Receiving controller 140 may include devices such as, for example, an engine controller, a regeneration controller, a hydraulics controller, a payload controller, a transmission controller, etc. In addition, any other device configurable to receive information from controller 100 and control any electronically controllable operation of work machine 30 may be included in receiving controller 140.

Receiving controller 140 may use the received information to perform tasks similar to those performed by primary component 110. For example, receiving controller 140 may be configured to use received clock information from controller 100 to timestamp log messages being sent from work machine 30 to other remote entities. In addition, receiving controller 140 may use received clock information to control the start time and stop time of work machine 30 as per a predetermined timetable. Furthermore, receiving controller 140 may use clock information received to control the regeneration of an exhaust element. Work machine 30 may or may not include a device such as gateway component 120 that may connect to external clock system 40. Therefore, in some embodiments, receiving controller 140 may be unable to obtain information directly from external clock system 40. Instead, receiving controller 140 may receive this information from sources located off board work machine 30 such as, for example, controller 100 on work machine 20 or other similar machines or sources.

Receiving controller 140 may operably connect to primary component 110 using one or more data communication ports. These ports may include, for example, Ethernet ports, wireless ports, datalink ports, optical fiber ports, etc. In addition, any other data communication port configurable to transfer information between primary component 110 and receiving controller 140 may be used to connect receiving controller 140 to primary component 110. Receiving controller 140 may receive information from primary component 110 as part of special communication messages, or as part of regular communication messages. For example, upon receiving a request from receiving controller 140, primary component 110 may transmit clock information received from gateway component 120 to receiving controller 140 in a special clock update message. Alternatively, primary component 110 may include this clock information as part of a control message sent to receiving controller 140. This control message may include other information, such as, for example, the location of work machine 20.

In an exemplary embodiment, primary component 110 may transfer clock information to receiving controller 140 using one or more data communication protocols. These data communications protocols may include, for example, a wireless Ethernet protocol, a cellular protocol, a real time clock synchronization protocol, etc. The type of protocol used to transfer information from primary component 110 to receiving controller 140 may depend on the type of data connection between work machine 20 and work machine 30. For example, if a wireless Ethernet connection is provided between work machine 20 and work machine 30, then primary component 110 may transfer information to receiving controller 140 using a wireless Ethernet protocol such as, for example, 802.11b, 802.11g, etc. Alternatively, if a cellular network is used to provide connectivity between work machine 20 and work machine 30, cellular protocols related to cellular standards such as GSM, CDMA, TDMA, etc., may be used to transfer information from primary component 110 to receiving controller 140.

In an exemplary embodiment, an application layer protocol such as Real Time Clock Synchronization Protocol ("RTCSP"), may be used to transfer information from primary component 110 to receiving controller 140. RTCSP is an application layer protocol that permits data to be delivered from a master device to a slave device. Based on an arbitration procedure on a shared data connection, RTCSP may be configured to determine a master device and the corresponding slave devices on the shared data connection. The master device may then be configured to transmit data to the corresponding slave devices. During the arbitration process, factors, such as, for example, the quality of hardware in each device, the location of each device, the types of connections on each device, and the CPU power of each device may be considered to determine the master device amongst a group of devices on the shared data connection.

In an exemplary embodiment, if primary component 110 and receiving controller 140 are on a shared data connection and are further configured to use RTCSP, then, based on factors such as, for example, the hardware used in primary component 110, the presence of a connection between primary component 110 and gateway component 120, and other such factors, RTCSP may be configured to select primary component 110 as a master device and receiving controller 140 as a slave device. Primary component 110 may then transfer information to receiving controller 140 using RTCSP.

Figure 3:
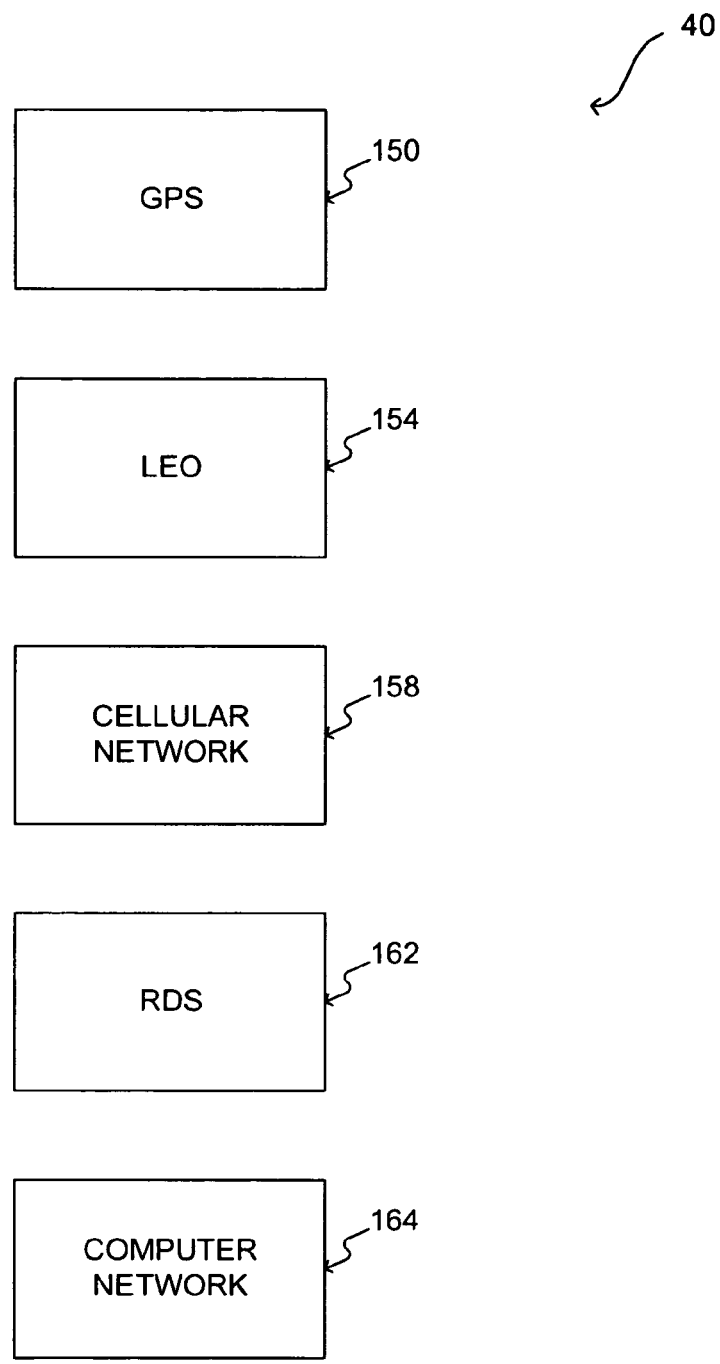
FIG. 3 is a block diagram representation of an external clock source system according to an exemplary disclosed embodiment.

FIG. 3 is a block diagram representation of external clock system 40. In an exemplary embodiment, external clock system 40 may include a global positioning system ("GPS") 150, a low earth orbit satellite ("LEO") 154, a cellular network 158, a radio data system ("RDS") 162, and a computer network 164. System 40 may include any or all of these clock sources or other possible clock sources. The software application in gateway component 120 may be configured to use a predetermined order in choosing a clock source from amongst the ones available in external clock system 40. Thus, in an exemplary embodiment, gateway component 120 may be configured to choose an external clock source from one of GPS 150, LEO 154, cellular network 158, RDS 162, and computer network 164, in some order of preference. This order of preference may be determined by an algorithm executed by the software application in gateway component 120.

GPS 150 may include a plurality of satellites, each including an atomic clock or any other clock source. When a satellite that is part of GPS 150 acts as a clock source, the atomic time clock in the satellite may be used to provide information to gateway component 120. LEO 154 includes a group of low earth orbiting satellites. The satellites in LEO 154 may have a different orbital path than those in GPS 150. For example, in an exemplary embodiment, the satellites in GPS 150 may be geostationary satellites, i.e., satellites orbiting the earth directly over the equator, at a height of approximately 22,000 miles. On the other hand, a LEO satellite may orbit the earth at an altitude of only a few hundred miles. Like a satellite in GPS 150, a satellite in LEO 154 may include an atomic clock that may be used to provide information to gateway component 120. Various satellite providers provide information from GPS 150 and LEO 154. For example, a satellite provider such as ORBCOM may be used to provide information from LEO 154 for gateway component 120.

Cellular network 158 may include a telecommunication network used to provide cell phone service. Specifically, cellular network 158 may include cell phone towers that are used to relay phone conversations and messages from one cell phone subscriber to another. In addition, cell phone towers may also be configured to relay clock information to cell phones. Cell phone towers may obtain clock information from a satellite with the help of a satellite receiver located at the cell phone towers or a base station. In an exemplary embodiment, cell phone towers may be configured to relay clock information obtained from a satellite to gateway component 120. Cellular network 158 may operate on 2G cellular standards, such as, for example, CDMA (Code Division Multiple Access), GSM (Global System for Mobile Communications), and TDMA (Time Division Multiple Access). Alternatively, or in addition, cellular network 158 may also operate on 2.5G and/or 3G standards, such as, for example, GPRS (General Packet Radio Service) and WCDM (Wideband Code Division Multiple Access). In addition, cellular network 158 may operate on any other cellular standard configurable to permit the transmission of information from cellular network 158 to gateway component 120.

RDS 162 may include various types of radio stations, such as, for example, AM, FM, and XM radio stations, that transmit radio programming within different frequency bands. Each radio station utilizes a clock source to affect programming. Thus, RDS 162 may be configured to act as a clock source wherein the information used by each radio station for programming is made available to gateway component 120. In particular, gateway component 120 may be configured to obtain clock information from RDS 162.

Computer network 164 may include one or more computing devices that include a clock source. For example, a computer network may include devices such as routers that may perform data packet forwarding functions and also act as clock sources. The routers in a computer network may obtain their clock information directly or indirectly from an atomic clock. For example, a gateway router (not shown) may obtain clock information directly from an atomic clock. Downstream routers in the computer network may be configured to obtain their clock information from the gateway router. The gateway routers and downstream routers may be configured to supply information to any, or in some instances, a list of predetermined recipients. In an exemplary embodiment, gateway component 120 may be configured to receive information from a gateway or a downstream router in computer network 164. In addition, any other computing device such as a switch, server, etc., that may include clock information, may act as a clock source in computer network 164.

One skilled in the art will appreciate that the external clock sources described above are exemplary in nature only. As other clock sources become available and capable of providing information to gateway component 120, they may also be used as clock sources in external clock system 40.

Referring back to FIG. 2, gateway component 120 may connect to GPS 150 and LEO 154 using a communication port. In an exemplary embodiment, gateway component 120 may be configured to operate as a satellite receiver and use a serial port to communicate with GPS 150 and LEO 154. The serial port may be configured to operate with serial protocols, such as, for example, NMEA 183, to help gateway component 120 communicate with GPS 150 and LEO 154. In addition, other protocols that may provide communication between a receiver and satellite may also be used for communication between gateway component 120 and GPS 150 and LEO 154.

In addition, or alternatively, gateway component 120 may be configured to connect to all clock sources within external clock system 40 through a protocol conversion device. In an exemplary embodiment, gateway component 120 may connect to a protocol conversion device (not shown) via a serial or datalink connection. The protocol conversion device may also connect to the clock sources within external clock system 40. The protocol conversion device may include various types of data ports to communicate with gateway component 120 and external clock system 40. For example, gateway component 120 may connect to the protocol conversion device using a datalink port. Specifically, gateway component 120 may connect to the protocol conversion device using a port that is configured to use a datalink protocol, such as, for example, J1939. Furthermore, the protocol conversion device may connect to GPS 150 using a serial port that is configured to operate with NMEA 183 protocol. The protocol conversion device may be configured to transfer packets between the serial port and the datalink port by translating the information from NMEA 183 to J1939 and vice versa.

In addition, the protocol conversion device may include a first wireless port configured to connect to cellular network 158. The first wireless port may be configured to communicate using a protocol compatible with a communication standard being used by cellular network 158. For example, if cellular network 158 is a GSM network, the first wireless port on the protocol conversion device may be configured to communicate with cellular network 158 using GSM. Alternatively, if cellular network 158 is a CDMA network, the first wireless port may be configured to operate on CDMA. Similarly, the protocol conversion device may include a second wireless port to communicate with RDS 162 and an Ethernet port to connect to computer network 164. Alternatively, the protocol conversion device may include a third wireless port, optical fiber port, coaxial cable port, or any other such port to connect to computer network 164.

The protocol conversion device may include software to help transfer information from one port to another and also to translate information from one communication protocol to another. This software may be configured in any type of computing language, such as C, C++, Pascal, Visual C++, or Visual Basic, etc. In addition, the protocol conversion device may include a CPU, RAM, I/O modules, and any other component needed to run the software application.

The software application in gateway component 120 may be configured so that gateway component 120 may choose the appropriate clock source from those available in external clock system 40 according to a predetermined order. In an exemplary embodiment, the predetermined order may include ordering GPS 150 before LEO 154, ordering LEO 154 before cellular network 158, ordering cellular network 158 before RDS 162, and ordering RDS 162 before computer network 164. If computer network 164 is unavailable, the software application in gateway component 120 may be configured to obtain information from battery-operated clock 130 instead of external clock system 40. Thus, if GPS 150 is unavailable, gateway component 120 may, according to the predetermined order, choose LEO 154 as a clock source. However, if LEO 154 is unavailable, then gateway component 120 may choose cellular network 158 as a clock source, etc.

The order used by the software application in gateway component 120 to choose an appropriate clock source from external clock system 40 may depend on various factors. These factors may include, for example, the perceived or expected accuracy of the clock in the clock source, the cost of obtaining service from the clock source provider, the ease of obtaining information from the clock source, etc. For example, GPS 150 may use an atomic clock that may be considered as the most accurate clock available. Furthermore, GPS 150 may be available at almost all times as a clock source for work machine 20 because of factors such as, for example, the orbital path, configuration, and altitude of GPS 150. This may make the choice of GPS 150 the most attractive vis-à-vis other clock sources that may not use a clock as accurate as the atomic clock and/or that are not as readily available as GPS 150. One skilled in the art will appreciate that the order described above is exemplary only and that any other order may be used to choose a clock source from external clock system 40 depending on, for example, the selection criteria supplied by a user of global clock synchronization system 10.

Gateway component 120 may be configured to transfer information between primary component 110 and off-board devices and systems. In an exemplary embodiment, gateway component 120 may be configured to transfer information between external clock system 40 and primary component 110. Specifically, gateway component 120 may transfer clock information obtained from external clock system 40 to primary component 110. Gateway component 120 may communicate with primary component 110 using a data connection, such as, for example, an Ethernet connection, datalink connection, wireless connection, or any other such connection. In addition, primary component 110 may transfer a portion of the received information to other controllers including receiving controller 140.

Primary component 110 may represent one or more devices that may be configured to control the operations of work machine 20 with the help of a program file. In an exemplary embodiment, primary component 110 may include devices, such as, for example, an engine controller module to control knocking in the engine of work machine 20, a regeneration controller module to control regeneration of an exhaust element in work machine 20, a transmission controller module, a hydraulics controller module, or any other device capable of controlling at least one operation of work machine 20. Primary component 110 may control at least one operation of work machine 20 with a program file. The program file for primary component 110 may be written in any computing language, such as, for example, C, C++, Pascal, Visual C++, Visual Basic, etc.

As mentioned above, primary component 110 may be used to control various operations of work machine 20 with the aid of a program file. For example, primary component 110 may be configured to control knocking in an engine. "Knocking" is undesired fuel combustion detrimental to emissions, fuel economy, and engine longevity. Alternatively, primary component 110 may be configured as a regeneration controller to control the "regeneration" of an exhaust element in an engine of a work machine. "Regeneration" is the process of heating the particulate matter trapped in an exhaust element to a temperature at which the particulate matter combusts or vaporizes. In addition, primary component 110 may be configured to perform other such functions/operations of a work machine. Primary component 110 may include components suitable for carrying out various operations for work machine 20. These components may include, for example, a memory (not shown) and a CPU (not shown), I/O modules (not shown), and any other component needed to run a program file.

Primary component 110 may use the information received from external clock system 40 through gateway component 120 to affect any electronically controllable operation of work machine 20. Specifically, primary component 110 may use the clock information received from gateway component 120 to affect operations such as regeneration, engine operation, etc. For example, primary component 110 may use the received clock information to timestamp regeneration log messages. This would aid a user or machine monitoring the regeneration process in work machine 20 to determine when certain regeneration related events occur. Based on this information, a user or machine may make changes that may affect the operation of work machine 20. In addition, primary component 110 may timestamp other log messages using the clock information received from gateway component 120.

In some embodiments, primary component 110 may be used to directly control functions such as regeneration operations, engine operations, etc., based on received clock information. For example, primary component 110 may use the clock information received from gateway component 120 to control the start time and stop time of a power source such as, for example, an engine of work machine 20. Specifically, there may be a need to electronically control the operation time of an engine of work machine 20 as per a predetermined timetable. This may be due to factors such as, for example, security regulations, environmental regulations, etc. In such instances, primary component 110 may use the clock information obtained from external clock system 40 to accurately control the start time and stop time, and thus the operation time of the engine of work machine 20 in accordance with the predetermined timetable.

In addition to affecting the operation of work machine 20 using information received from external clock system 40, controller 100 may also transfer information received from external clock system 40 to other controllers (not shown) located on work machine 20. Either primary component 110 or gateway component 120 may be used to transfer this information to other controllers. These other controllers may include devices that, like controller 100, affect the operation of work machine 20 but do not have a direct connection to external clock system 40. For example, if controller 100 includes an engine controller module ("ECM"), controller 100 may transfer information received from external clock system 40 to a regeneration controller that does not have a direct connection to external clock system 40. In an exemplary embodiment, primary component 110 may transfer clock information received from external clock system 40 through gateway component 120, to other controllers on work machine 20. Thus, other controllers on work machine 20 may also use information received from external clock system 40 to affect the operation of work machine 20, even though the other controllers are not directly connected to external clock system 40.

Primary component 110 may transfer information to other controllers on work machine 20 using one or more data communication ports. These data communication ports may include, for example, serial ports, Ethernet ports, wireless ports, datalink ports, etc. In an exemplary embodiment, primary component 110 is configured to transfer information to other controllers over a datalink port that is configured to operate on datalink protocols, such as, for example, J1939, SAEJ1587, etc.

In addition, controller 100 may also transfer information received from external clock system 40 to other work machines. As noted above, either primary component 110 or gateway component 120 may be configured to transfer this information to other work machines. In an exemplary embodiment, primary component 110 may be configured to transfer the received information to receiving controller 140 located on work machine 30. As noted above, receiving controller 140 may be similar to controller 100 in configuration and functions performed. However, unlike controller 100, receiving controller 140 may lack a direct connection to external clock system 40. Work machine 30 may be located at the same work site as that of work machine 20. Alternatively, work machine 30 may be located in a geographically distant location such as a different county, city, state, or country from that of work machine 20.

Industrial Applicability

Figure 4:
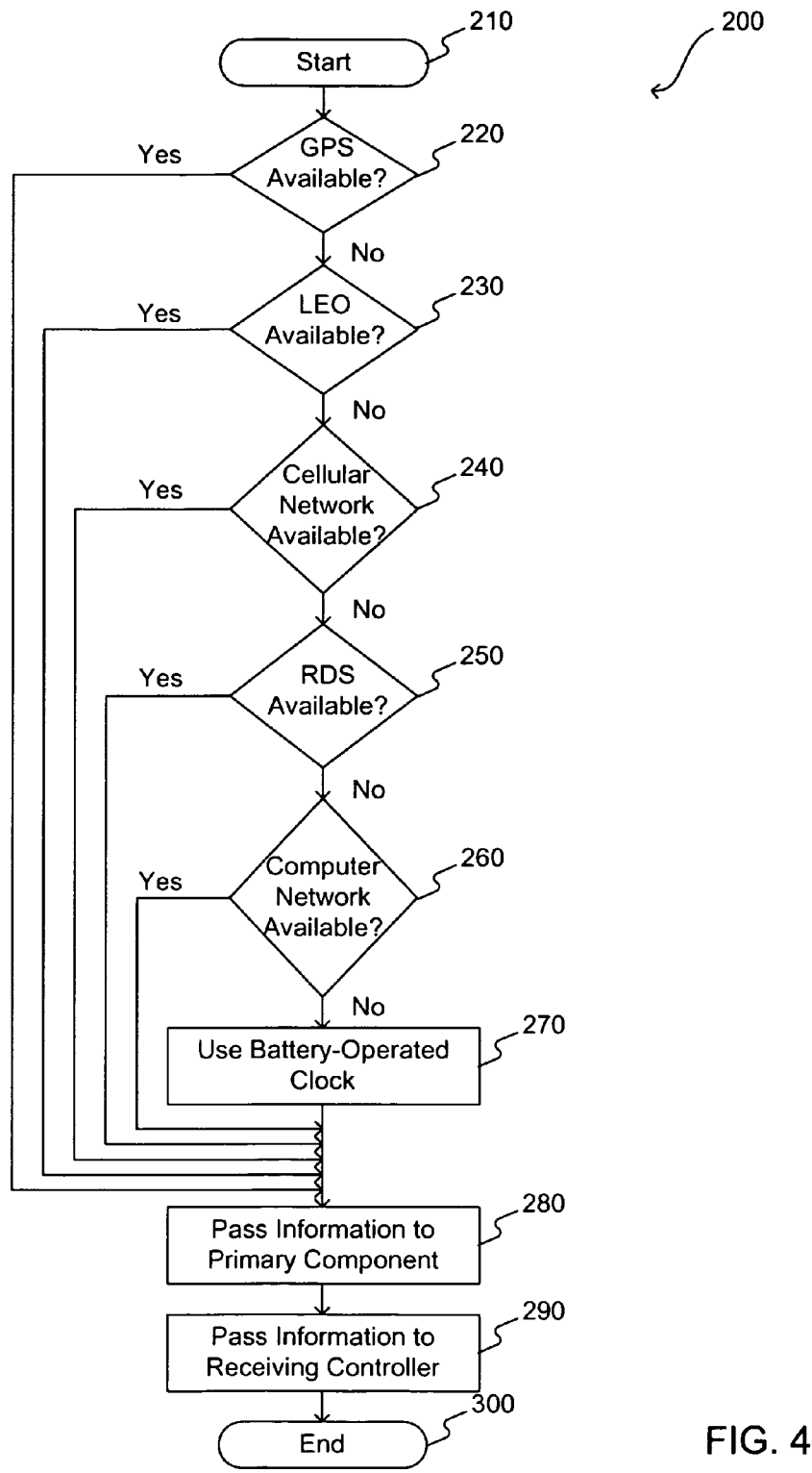
FIG. 4 is a flow chart representation of a method of global clock synchronization according to an exemplary disclosed embodiment.

FIG. 4 provides a flow chart illustrating the steps of an exemplary disclosed clock synchronization control method 200. At step 210, gateway component 120 may begin to obtain information from external clock source system 40. Gateway component 120 may be configured to obtain information from external system 40 at predetermined intervals of time that may be set, for example, by an operator. Alternatively, gateway component 120 may be configured to obtain this information upon receiving a request for information from primary component 110. Furthermore, gateway component 120 may be configured to choose a clock source from external clock system 40 according to a predetermined order configured in the software application running on gateway component 120. The predetermined order may be configured by a user or may be a factory-configured default order that is alterable by a user.

At step 220, gateway component 120 may determine if GPS 150 is available as a clock source. If GPS 150 is unavailable as a clock source (e.g., due to bad weather, satellite out of service, etc.), then gateway component 120, at step 230, may attempt to obtain information from LEO 154. If LEO 154 is unavailable, then gateway component 120 may attempt to obtain information from cellular network 158 at step 240. If cellular network 158 is unavailable as a clock source, gateway component 120 may attempt to obtain information from RDS 162 at step 250. If RDS 162 is unavailable, then at step 260, gateway component 120 may attempt to obtain information from computer network 164. Finally, if computer network 164 is unavailable, then at step 270, gateway component 120 may obtain information from battery-operated clock 130. At step 280, gateway component 120 may pass the information obtained from one of the above-mentioned clock sources to primary component 110. At step 290, primary component 110 may pass the information obtained from gateway component 120 to other controllers including receiving controller 140.

The disclosed clock synchronization method and system may be used in any system designed to use an accurate and stable clock source as a source of information. By obtaining information from an external clock source, the disclosed system may provide information from a source that is unaffected by climatic conditions, operating conditions, and other such factors. Furthermore, by providing for a plurality of external clock sources, the disclosed system provides for a back-up capability to account for situations where one or more clock sources may become unavailable. In addition, the predetermined order provides for obtaining information from the most accurate clock source available.

The use of a gateway component and primary component in the controller of the disclosed system may help reduce the cost of obtaining information from an external clock source. For example, the gateway component obviates the need for all controllers in a system to have a direct connection to an external clock source because it can pass information to the primary component, which may in turn pass the information to other controllers. A reduction in the number of connections to an external clock source may reduce the overall cost of a system. In addition, the disclosed system may also reduce the cost of designing a geographically dispersed fleet of work machines. This is because the primary component on a work machine in the disclosed system may transfer information received from the gateway component to controllers on other work machines in the fleet. This obviates the need for other work machines in the fleet to have direct connections to external clock sources, thereby leading to a reduction in the cost of designing the fleet.

It will be apparent to those skilled in the art that various modifications and variations can be made in the disclosed global clock synchronization system and method without departing from the scope of the disclosure. Additionally, other embodiments of the disclosed system will be apparent to those skilled in the art from consideration of the specification. It is intended that the specification and the examples be considered exemplary only, with a true scope of the disclosure being indicated by the following claims and their equivalents.

What is claimed is:

1. A clock synchronized control system comprising:
a controller configured to:
control at least one function of a machine;
select a clock source from among a plurality of external clock sources based on a predetermined order, wherein the plurality of clock sources includes a global positioning system ("GPS") and a low earth orbiting satellite ("LEO"), wherein selecting based on the predetermined order includes selecting the GPS before the LEO;
obtain clock information from the selected clock source; and
use the obtained information to affect the at least one function of the machine.

2. The clock synchronized control system of claim 1, wherein the controller includes a primary component and a gateway component;
the gateway component being configured to select the clock source from among the plurality of external clock sources based on the predetermined order, obtain information from the selected clock source, and transmit the obtained information to the primary component; and
the primary component being configured to use the obtained information to affect the at least one function of the machine.

3. The clock synchronized control system of claim 2, wherein the primary component includes a processor separate from a processor of the gateway component.

4. The clock synchronized control system of claim 1, wherein the clock information is used by the controller to timestamp a message sent from the machine to a remote system.

5. The clock synchronized control system of claim 1, wherein the clock information is used by the controller to affect the start time and stop time of a power source of the machine.

6. The clock synchronized control system of claim 1, wherein the clock information is used by the controller to affect a regeneration duration of an exhaust element of the machine.

7. The clock synchronized control system of claim 2, further including a receiving controller operably connected to at least one of the primary and gateway components, the receiving controller being configured to:
control at least one function of another machine;
obtain clock information from at least one of the primary and gateway components; and
use the obtained clock information to affect the at least one function of the another machine.

8. The clock synchronized control system of claim 7, wherein the clock information obtained from at least one of the primary and gateway components is used by the receiving controller to timestamp a message sent from the another machine to a remote system.

9. The clock synchronized control system of claim 7, wherein the clock information obtained from at least one of the primary and gateway components is used by the receiving controller to affect the start time and stop time of a power source of the another machine.

10. The clock synchronized control system of claim 7, wherein the clock information obtained from at least one of the primary and gateway components is used by the receiving controller to affect a regeneration duration of an exhaust element of the another machine.

11. The clock synchronized control system of claim 7, wherein the receiving controller receives clock information from at least one of the primary and gateway components using one or more data protocols.

12. The clock synchronized control system of claim 11, wherein the one or more data protocols include at least one of a wireless Ethernet protocol, cellular protocol and real time clock synchronization protocol.

13. The clock synchronized control system of claim 1, wherein the plurality of clock sources further includes a cellular network, a radio data system ("RDS"), and a computer network, and wherein selecting based on the predetermined order includes selecting the GPS before the LEO, selecting the LEO before the cellular network, selecting the cellular network before the RDS, and selecting the RDS before the computer network.

14. A method for clock synchronized control of a machine, the method comprising:
selecting a clock source from among a plurality of external clock sources based on a predetermined order, wherein the plurality of clock sources includes a global positioning system ("GPS") and a low earth orbiting satellite ("LEO"), wherein selecting based on the predetermined order includes selecting the GPS before the LEO;
obtaining clock information from the selected clock source; and
using the clock information to timestamp data being sent from the machine.

15. The method of claim 14, wherein the sent data is a message sent from the machine to a remote system.

16. The method of claim 14, further including transmitting the obtained clock information to another machine that is remotely located from the machine.

17. The method of claim 16, further including using the clock information received at the another machine to control one or more electronically controllable operations of the another machine.

18. The method of claim 14, wherein the plurality of clock sources further includes a cellular network, a radio data system ("RDS"), and a computer network, and wherein selecting based on the predetermined order includes selecting the GPS before the LEO, selecting the LEO before the cellular network, selecting the cellular network before the RDS, and selecting the RDS before the computer network.

19. A clock information transfer system including:
a first machine including a controller configured to:
control at least one function of the first machine;
select a clock source from among a plurality of external clock sources based on a predetermined order, wherein the plurality of clock sources includes a global positioning system ("GPS") and a low earth orbiting satellite ("LEO"), wherein selecting based on the predetermined order includes selecting the GPS before the LEO;
obtain clock information from the selected clock source;
use the obtained clock information to affect the at least one function of the first machine; and
transmit the obtained clock information to a second machine including a receiving controller, the receiving controller being configured to:
control at least one function of the second machine;
operably connect to the controller of the first machine;
obtain clock information from the controller of the first machine; and
use the obtained clock information to affect the at least one function of the second machine.

20. The clock information transfer system of claim 19, wherein the obtained clock information is used by the controller to timestamp a message sent from the first machine to a remote system.

21. The clock information transfer system of claim 19, wherein the obtained clock information is used by the controller to affect the start time and stop time of a power source of the first machine.

22. The clock information transfer system of claim 19, wherein the obtained clock information is used by the controller to affect a regeneration duration of an exhaust element of the first machine.

23. The clock information transfer system of claim 19, wherein the obtained clock information is used by the receiving controller to control one or more electronically controllable operations of the second machine.

24. The clock information transfer system of claim 19, wherein the plurality of clock sources further includes a cellular network, a radio data system ("RDS"), and a computer network, and wherein selecting based on the predetermined order includes selecting the GPS before the LEO, selecting the LEO before the cellular network, selecting the cellular network before the RDS, and selecting the RDS before the computer network.

25. A machine comprising:
a frame;
an engine operably connected to the frame; and
a controller configured to:
control at least one function of a machine;
select a clock source from among a plurality of external clock sources based on a predetermined order, wherein the plurality of clock sources includes a global positioning system ("GPS") and a low earth orbiting satellite ("LEO"), wherein selecting based on the predetermined order includes selecting the GPS before the LEO;
obtain clock information from the selected clock source; and
control the amount of time that the engine is running by controlling the start time of the engine and controlling the stop time of the engine with the clock information.

26. The machine of claim 25, wherein the controller controls the start time of the engine and the stop time of the engine based on a predetermined timetable.

27. The machine of claim 25, wherein the plurality of clock sources further includes a cellular network, a radio data system ("RDS"), and a computer network, and wherein selecting based on the predetermined order includes selecting the GPS before the LEO, selecting the LEO before the cellular network, selecting the cellular network before the RDS, and selecting the RDS before the computer network.

* * * * *